United States Patent
Sawa et al.

(10) Patent No.: US 9,705,135 B2
(45) Date of Patent: Jul. 11, 2017

(54) NEGATIVE ELECTRODE FOR NONAQUEOUS ELECTROLYTE SECONDARY BATTERY AND NONAQUEOUS ELECTROLYTE SECONDARY BATTERY

(71) Applicant: SANYO Electric Co., Ltd., Daito-shi, Osaka (JP)

(72) Inventors: Shouichiro Sawa, Tokushima (JP); Ayano Toyoda, Osaka (JP); Taizou Sunano, Hyogo (JP)

(73) Assignee: SANYO Electric Co., Ltd., Osaka (JP)

( * ) Notice: Subject to any disclaimer, the term of this patent is extended or adjusted under 35 U.S.C. 154(b) by 0 days.

(21) Appl. No.: 14/779,881

(22) PCT Filed: Mar. 19, 2014

(86) PCT No.: PCT/JP2014/001574
§ 371 (c)(1),
(2) Date: Sep. 24, 2015

(87) PCT Pub. No.: WO2014/156068
PCT Pub. Date: Oct. 2, 2014

(65) Prior Publication Data
US 2016/0056475 A1     Feb. 25, 2016

(30) Foreign Application Priority Data
Mar. 26, 2013   (JP) ................... 2013-065103

(51) Int. Cl.
*H01M 4/134* (2010.01)
*H01M 4/78* (2006.01)
(Continued)

(52) U.S. Cl.
CPC ............. *H01M 4/78* (2013.01); *H01M 4/134* (2013.01); *H01M 4/386* (2013.01); *H01M 4/622* (2013.01);
(Continued)

(58) Field of Classification Search
CPC ...... H01M 4/134; H01M 4/622; H01M 4/386; H01M 10/052; H01M 2004/027; H01M 2004/025; H01M 2004/021; Y02E 60/122
See application file for complete search history.

(56) References Cited

U.S. PATENT DOCUMENTS

2004/0072067 A1* 4/2004 Minami ............. H01M 4/0419
429/212
2006/0024586 A1 2/2006 Tamura et al.
(Continued)

FOREIGN PATENT DOCUMENTS

CN      101436656 A    5/2009
JP      11-97028 A     4/1999
(Continued)

OTHER PUBLICATIONS

Translation of Written Opinion dated Apr. 28, 2014, issued in counterpart International Application No. PCT/JP2014/001574. (11 pages).
(Continued)

*Primary Examiner* — Cynthia K Walls
(74) *Attorney, Agent, or Firm* — Westerman, Hattori, Daniels & Adrian, LLP

(57) ABSTRACT

There are provided a negative electrode for a nonaqueous electrolyte secondary battery having excellent initial efficiency and good moldability of pillar portions included in a negative electrode mixture layer, and a nonaqueous electrolyte secondary battery. A negative electrode (20) for a nonaqueous electrolyte secondary battery according to one aspect of the present invention includes a negative electrode current collector (21) and a negative electrode mixture layer (22) formed on the negative electrode current collector (21) and containing a binder and a negative electrode active material particle that forms an alloy with lithium. The negative electrode mixture layer (22) includes a base portion (22*a*) near the negative electrode current collector (21) and pillar portions (22*b*) formed on the base portion (21*a*). The binder contains a polyimide resin. The polyimide resin has an average molecular weight of 60000 or more.

9 Claims, 2 Drawing Sheets

(51) Int. Cl.
*H01M 4/62* (2006.01)
*H01M 4/38* (2006.01)
*H01M 4/02* (2006.01)
*H01M 10/052* (2010.01)

(52) U.S. Cl.
CPC .... *H01M 10/052* (2013.01); *H01M 2004/025* (2013.01); *H01M 2004/027* (2013.01)

(56) References Cited

U.S. PATENT DOCUMENTS

| | | |
|---|---|---|
| 2009/0123840 A1 | 5/2009 | Shirane et al. |
| 2010/0151321 A1 | 6/2010 | Yamamoto et al. |
| 2011/0027650 A1* | 2/2011 | Yamamoto ............ H01M 4/134 429/218.1 |

FOREIGN PATENT DOCUMENTS

| | | |
|---|---|---|
| JP | 2003-303586 A | 10/2003 |
| JP | 2004-179136 A | 6/2004 |
| JP | 2004-296103 A | 10/2004 |
| JP | 2007-157704 A | 6/2007 |
| WO | 2006/025601 A1 | 3/2006 |
| WO | 2007/074654 A1 | 7/2007 |

OTHER PUBLICATIONS

International Search Report dated Apr. 28, 2014, issued in counterpart application No. PCT/JP2014/001574 (2 pages).
Office Action dated Sep. 5, 2016, issued in counterpart Chinese Patent Application No. 201480017525.4. (6 pages).

\* cited by examiner

NEGATIVE ELECTRODE FOR NONAQUEOUS ELECTROLYTE SECONDARY BATTERY AND NONAQUEOUS ELECTROLYTE SECONDARY BATTERY

TECHNICAL FIELD

The present invention relates to a negative electrode for nonaqueous electrolyte secondary batteries and a nonaqueous electrolyte secondary battery that uses the negative electrode.

BACKGROUND ART

In order to increase the energy density and output of nonaqueous electrolyte secondary batteries, a study on using, as a negative electrode active material, a material that forms an alloy with lithium, such as silicon, germanium, tin, or zinc, instead of a carbon material such as graphite has been conducted in recent years. However, a negative electrode that uses a material containing silicon or the like as a negative electrode active material undergoes considerable volume expansion or shrinkage during occlusion and release of lithium. Therefore, in nonaqueous electrolyte secondary batteries including a negative electrode that uses a material containing silicon as a negative electrode active material, swelling of cells, formation of fine powder of a negative electrode active material, and detachment of a negative electrode active material from a current collector by stress occur as the charge-discharge cycle proceeds. These phenomena result in degradation of cycle characteristics.

PTL 1 discloses a nonaqueous electrolyte secondary battery that uses a negative electrode obtained by forming a plurality of pillar-shaped protruding portions on a thin film that is made of silicon and deposited on a negative electrode current collector. The plurality of pillar-shaped protruding portions are made of silicon and have a larger thickness than portions around the protruding portions.

The negative electrode in the nonaqueous electrolyte secondary battery disclosed in PTL 1 is obtained by forming a silicon thin film serving as a base layer on a surface of a negative electrode current collector by a sputtering method and furthermore forming pillar-shaped protruding portions made of silicon on the surface of the silicon thin film by a lift-off method including sputtering and etching in a combined manner. The negative electrode has cavities that absorb the volume expansion of the negative electrode active material during charging around the pillar-shaped protruding portions, whereby the swelling of cells is suppressed and a large stress is prevented from being applied to the negative electrode current collector.

CITATION LIST

Patent Literature

PTL 1: Japanese Published Unexamined Patent Application No. 2003-303586

SUMMARY OF INVENTION

Technical Problem

In the nonaqueous electrolyte secondary battery that uses the negative electrode disclosed in PTL 1, wrinkling caused on the negative electrode current collector by charging and discharging is suppressed, the swelling of cells is small, and the volumetric energy density is high. In the nonaqueous electrolyte secondary battery disclosed in PTL 1, however, a large-scale vacuum apparatus needs to be used when a sputtering method is performed and also an etching method is required. Therefore, further improvements can be made in the structure of the negative electrode.

Solution to Problem

A negative electrode for a nonaqueous electrolyte secondary battery according to one aspect of the present invention includes a current collector and a negative electrode mixture layer formed on the current collector and containing a binder and a negative electrode active material particle that forms an alloy with lithium. The negative electrode mixture layer includes a base portion near the current collector and pillar portions formed on the base portion, the binder contains a polyimide resin, and the polyimide resin has an average molecular weight of 60000 or more.

Advantageous Effects of Invention

The negative electrode for a nonaqueous electrolyte secondary battery according to one aspect of the present invention includes a negative electrode mixture layer including a binder and a negative electrode active material particle that forms an alloy with lithium. Therefore, even if the negative electrode active material particle expands during charging, the expansion is absorbed by cavities formed between the pillar portions of the negative electrode mixture layer. This also decreases the stress applied to the negative electrode current collector. Furthermore, even if the negative electrode active material particle expands and shrinks as a result of charging and discharging, the bonds between the negative electrode active material particles and between the negative electrode active material particle and the current collector are maintained by the binder. Therefore, the electron conductivity between the negative electrode active material particles and the electron conductivity between the negative electrode active material particle and the current collector are maintained. Thus, a nonaqueous electrolyte secondary battery having a high capacity retention ratio can be obtained by using the negative electrode for a nonaqueous electrolyte secondary battery according to one aspect of the present invention.

Furthermore, in the negative electrode for a nonaqueous electrolyte secondary battery according to one aspect of the present invention, the binder contains a polyimide resin and the polyimide resin has an average molecular weight of 60000 or more. Consequently, good moldability of the pillar portions included in the negative electrode mixture layer is achieved. Thus, the pillar-shaped structure of the negative electrode mixture layer is satisfactorily formed and the density can also be increased. Even if the negative electrode active material particle expands and shrinks during charging and discharging, the percentages of expansion and shrinkage are small. Furthermore, since there are many contacts between the negative electrode active material particles, good initial efficiency is achieved.

DESCRIPTION OF EMBODIMENTS

Figure 1:
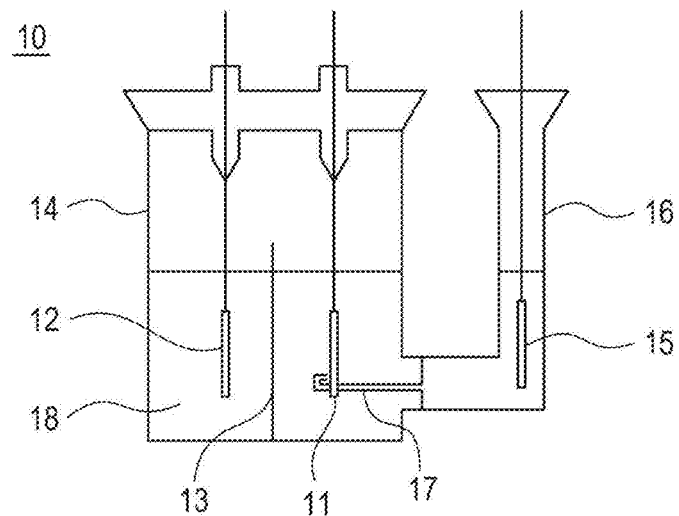
FIG. 1 schematically illustrates a monopolar cell used in the measurement of negative electrodes in Experimental Examples 3 to 13.

Hereafter, an embodiment of the present invention will be described in detail on the basis of Experimental Examples. The following Experimental Examples merely show one example of a negative electrode for nonaqueous electrolyte secondary batteries that embodies the technical idea of the present invention. The present invention is not intended to be limited to any of Experimental Examples. The present invention is equally applicable to various modifications without departing from the technical idea provided in the claims.

EXPERIMENTAL EXAMPLES 1 to 3

Preparation of Negative Electrode Mixture Slurry

Negative electrodes of Experimental Examples 1 to 3 will be described. Negative electrode mixture slurries used in Experimental Examples 1 to 3 were prepared by mixing silicon particles having an average particle diameter ($D_{50}$) of 3 μm and serving as a negative electrode active material, a graphite powder having an average particle diameter ($D_{50}$) of 3 μm and serving as a negative electrode conductive material, and a polyamic acid resin which is a precursor of a polyimide resin and serves as a negative electrode binder using N-methylpyrrolidone (NMP) as a dispersion medium. The mass ratio of the materials in the mixing was 92:3:5, and the solid content of the slurry was 47 mass %. A polyamic acid resin having an average molecular weight of 10000 (Experimental Example 1), a polyamic acid resin having an average molecular weight of 30000 (Experimental Example 2), and a polyamic acid resin having an average molecular weight of 60000 (Experimental Example 3) were used.

The negative electrode mixture slurries corresponding to Experimental Examples 1 to 3 were applied in a solid manner onto an electrolytically roughened surface of a copper alloy foil (C7025 alloy foil, composition: Cu 96.2 mass %, Ni 3 mass %, Si 0.65 mass %, and Mg 0.15 mass %) having a thickness of 18 μm and serving as a negative electrode current collector using a glass substrate applicator in the air at 25° C. and then semidried in a drying oven so that the NMP was left. A die including a plurality of pores formed thereon (pore size: 50 μm, depth of pores: 36 μm, pitch between pores: 70 μm, and distance between pores: 20 μm) was pressed against the surface of each of the semidried negative electrode mixture layers to perform molding. Then, the negative electrode mixture layer was completely dried. The plurality of pores are arranged in a staggered manner.

A heat treatment was then conducted at 400° C. for 10 hours to convert the polyamic acid resin into a polyimide resin and to perform sintering. The sintered product was cut into a size of 20×27 mm², and then a nickel (Ni) plate serving as a collector terminal was attached thereto to produce negative electrodes of Experimental Examples 1 to 3. The surface roughness Ra (JIS B 0601-1994) of the copper alloy foil was 0.25 μm, and the average distance between local peaks S (JIS B 0601-1994) of the surface of the copper alloy foil was 0.85 μm.

The negative electrodes of Experimental Examples 1 and 2 had poor moldability of the negative electrode mixture layer. When the die was removed after being pressed to perform molding, large cracks were formed in pillar portions. Therefore, the initial efficiency described below was not measured for the negative electrodes of Experimental Examples 1 and 2. The negative electrode of Experimental Example 3 had good moldability, and substantially uniform pillar portions were formed. The mixture density of the entire negative electrode mixture layer in Experimental Example 3 was 0.7 g/cm³.

EXPERIMENTAL EXAMPLES 4 to 6

Negative electrodes of Experimental Examples 4 to 6 were produced in the same manner as in Experimental Examples 1 to 3, except that the mass ratio of the silicon particles, the graphite, and the polyamic acid resin contained in the negative electrode mixture slurry during the mixing was changed to 90:3:7. A polyamic acid resin having an average molecular weight of 10000 (Experimental Example 4), a polyamic acid resin having an average molecular weight of 30000 (Experimental Example 5), and a polyamic acid resin having an average molecular weight of 60000 (Experimental Example 6) were used.

The negative electrode of Experimental Example 4 had poor moldability of the negative electrode mixture layer. When the die was removed after being pressed to perform molding, large cracks were formed in part of pillar portions. In the negative electrode of Experimental Example 5, when the die was removed after being pressed to perform molding, small cracks were formed in part of pillar portions. The negative electrode of Experimental Example 6 had good moldability, and substantially uniform pillar portions were formed. The mixture density of the entire negative electrode mixture layers in Experimental Examples 5 and 6 was 0.7 g/cm³.

EXPERIMENTAL EXAMPLES 7 to 9

Negative electrodes of Experimental Examples 7 to 9 were produced in the same manner as in Experimental Examples 1 to 3, except that the mass ratio of the silicon particles, the graphite, and the polyamic acid resin contained in the negative electrode mixture slurry during the mixing was changed to 87:3:10. A polyamic acid resin having an average molecular weight of 10000 (Experimental Example 7), a polyamic acid resin having an average molecular weight of 30000 (Experimental Example 8), and a polyamic acid resin having an average molecular weight of 60000 (Experimental Example 9) were used.

The negative electrode of Experimental Example 7 had poor moldability of the negative electrode mixture layer. When the die was removed after being pressed to perform molding, large cracks were formed in part of pillar portions. The negative electrodes of Experimental Examples 8 and 9 had good moldability, and substantially uniform pillar portions were formed. The mixture density of the entire negative electrode mixture layers in Experimental Examples 8 and 9 was 0.7 g/cm³.

EXPERIMENTAL EXAMPLES 10 to 12

Negative electrodes of Experimental Examples 10 to 12 were produced in the same manner as in Experimental Examples 1 to 3, except that the mass ratio of the silicon particles, the graphite, and the polyamic acid resin contained in the negative electrode mixture slurry during the mixing was changed to 84:3:13. A polyamic acid resin having an average molecular weight of 10000 (Experimental Example 10), a polyamic acid resin having an average molecular weight of 30000 (Experimental Example 11), and a polyamic acid resin having an average molecular weight of 60000 (Experimental Example 12) were used.

The negative electrode of Experimental Example 10 had poor moldability of the negative electrode mixture layer. When the die was removed after being pressed to perform molding, large cracks were formed in part of pillar portions. The negative electrodes of Experimental Examples 11 and 12 had good moldability, and substantially uniform pillar portions were formed. The mixture density of the entire negative electrode mixture layers in Experimental Examples 11 and 12 was 0.7 g/cm³.

EXPERIMENTAL EXAMPLE 13

A negative electrode of Experimental Example 13 was produced in the same manner as in Experimental Examples 1 to 3, except that the mass ratio of the silicon particles, the graphite, and the polyamic acid resin contained in the negative electrode mixture slurry during the mixing was changed to 79:3:18. A polyamic acid resin having an average molecular weight of 30000 was used. The mixture density of the entire negative electrode mixture layer was 0.7 g/cm³. The negative electrode of Experimental Example 13 had good moldability, and substantially uniform pillar portions were formed. The mixture density of the entire negative electrode mixture layer in Experimental Example 13 was 0.7 g/cm³.

(Preparation of Nonaqueous Electrolytic Solution)

Fluoroethylene carbonate (FEC) and methyl ethyl carbonate (MEC) were mixed at a volume ratio (FEC:MEC) of 2:8 in an argon atmosphere. Lithium hexafluorophosphate (LiPF$_6$) was dissolved in the mixed solvent so as to have a concentration of 1 mol/L to prepare a nonaqueous electrolytic solution used for each of Experimental Examples 3 to 13.

(Production of Monopolar Cell)

A lithium foil serving as a counter electrode (positive electrode) to which a nickel plate was attached as a terminal was disposed so as to face the produced negative electrode of each of Experimental Examples 3 to 13 with a separator disposed therebetween. They were sandwiched between a pair of glass substrates and immersed in the nonaqueous electrolytic solution. A lithium foil to which a nickel plate was attached as a terminal was used as a reference electrode. FIG. 1 schematically illustrates a monopolar cell 10.

The monopolar cell 10 includes a measurement cell 14 in which a negative electrode 11, a counter electrode (positive electrode) 12, and a separator 13 are disposed and a reference electrode cell 16 in which a reference electrode 15 is disposed. A capillary 17 extends from the reference electrode cell 16 to near the surface of the positive electrode 12. The measurement cell 14 and the reference electrode cell 16 are each filled with a nonaqueous electrolytic solution 18. In the actually produced monopolar cell 10, the negative electrode 11 of each of Experimental Examples 1 to 5, the positive electrode 12, and the separator 13 are integrally sandwiched between a pair of glass substrates (not illustrated). However, the negative electrode 11, the positive electrode 12, and the separator 13 are schematically illustrated in FIG. 1 in a separated manner in order to clearly show the measurement principle.

(Measurement of Monopolar Characteristics)

A charge-discharge cycle test was performed on the monopolar cell 10 corresponding to the negative electrode of each of Experimental Examples 3 to 13 under the following conditions. First, charging was performed at a constant current of 0.3 mA until the voltage reached 110 mV vs. Li/Li$^+$, and the quantity of electricity that flowed herein was determined as an initial charge capacity. The state of charge was about 40%. Subsequently, discharging was performed at a constant current of 0.3 mA until the voltage reached 1000 mV vs. Li/Li$^+$, and the quantity of electricity that flowed herein was determined as an initial discharge capacity. The initial efficiency was determined using the following calculation formula.

Initial efficiency (%)=(initial discharge capacity/initial charge capacity)×100

Table 1 below collectively show the measured initial efficiency in each of Experimental Examples 3 to 13, together with the moldability of pillar portions of the negative electrode active material layer in each of Experimental Examples 1 to 13. The moldability was evaluated to be "Poor" when the pillar portions were not sufficiently formed, "Good" when small cracks were partly formed, but the pillar portions were formed in a stable shape, and "Excellent" when the pillar portions were formed in a more stable shape. The pillar portions of the negative electrode active material layer were checked by SEM observation.

A decrease in the mass caused when a polyimide resin is formed from the polyamic acid resin serving as a polyimide precursor is small, which is substantially negligible. Therefore, the content of the polyimide resin serving as a binder in the negative electrode mixture is substantially equal to the content of the polyamic acid resin in the negative electrode mixture.

TABLE 1

|  | Molecular weight of binder in the form of precursor | Content of negative electrode active material in negative electrode mixture (mass %) | Content of binder in negative electrode mixture (mass %) | Si particle diameter (μm) | Moldability | Initial efficiency (%) |
|---|---|---|---|---|---|---|
| Experimental Example 1 | 10000 | 92 | 5 | 3 | Poor | Not measured |
| Experimental Example 2 | 30000 | 92 | 5 | 3 | Poor | Not measured |
| Experimental Example 3 | 60000 | 92 | 5 | 3 | Excellent | 84 |

TABLE 1-continued

| | Molecular weight of binder in the form of precursor | Content of negative electrode active material in negative electrode mixture (mass %) | Content of binder in negative electrode mixture (mass %) | Si particle diameter (μm) | Moldability | Initial efficiency (%) |
|---|---|---|---|---|---|---|
| Experimental Example 4 | 10000 | 90 | 7 | 3 | Poor | 80 |
| Experimental Example 5 | 30000 | 90 | 7 | 3 | Good | 79 |
| Experimental Example 6 | 60000 | 90 | 7 | 3 | Excellent | 79 |
| Experimental Example 7 | 10000 | 87 | 10 | 3 | Poor | 75 |
| Experimental Example 8 | 30000 | 87 | 10 | 3 | Excellent | 74 |
| Experimental Example 9 | 60000 | 87 | 10 | 3 | Excellent | 74 |
| Experimental Example 10 | 10000 | 84 | 13 | 3 | Poor | 70 |
| Experimental Example 11 | 30000 | 84 | 13 | 3 | Excellent | 70 |
| Experimental Example 12 | 60000 | 84 | 13 | 3 | Excellent | 70 |
| Experimental Example 13 | 30000 | 79 | 18 | 3 | Excellent | 65 |

The following is found from the results shown in Table 1. In the comparison of the results of the moldability in Experimental Examples 1 to 13, "Excellent" is given in Experimental Examples 3, 6, 8, 9, and 11 to 13 and "Good" is given in Experimental Example 5 whereas "Poor" is given in Experimental Examples 1, 2, 4, 7, and 10 because the pillar portions are substantially not formed. In the case where the content of the binder in the negative electrode mixture is as low as 5 mass %, when the average molecular weight of the polyamic acid resin serving as a polyimide resin precursor is 60000 or more, good moldability is achieved. In the case where the content of the binder in the negative electrode mixture is 7 to 18 mass %, when the average molecular weight of the polyamic acid resin serving as a polyimide precursor is 30000 or more and the content of the binder in the negative electrode mixture is 7 mass % or more, good moldability is achieved.

In comprehensive consideration of these results, in particular, when a polyimide resin formed from a polyamic acid resin having an average molecular weight of 60000 or more is used as a binder, good moldability of the pillar portions formed of the negative electrode mixture is found to be achieved regardless of the content of the binder in the negative electrode mixture.

The initial efficiency decreases as the content of the binder in the negative electrode mixture increases. In the case where the content of the binder in the negative electrode mixture is the same, the initial efficiency is substantially the same when the molecular weight of the polyamic acid resin serving as a polyimide precursor is between 10000 and 60000. When the content of the binder in the negative electrode mixture was 18% (Experimental Example 13), the initial efficiency was 65%, which was the lowest value. The content of the negative electrode active material decreases as the content of the binder in the negative electrode mixture increases, and therefore the capacity density decreases. In view of the foregoing facts, the content of the binder in the negative electrode mixture is preferably 15 mass % or less.

The molecular weight of the polyamic acid resin serving as a polyimide precursor is preferably up to about 200000 because an excessively high molecular weight causes brittleness.

The molecular weight of the polyimide in the negative electrode mixture after heat treatment was substantially equal to the molecular weight of the polyamic acid resin serving as a polyimide precursor.

In Experimental Examples 1 to 13, the particle diameter of the negative electrode active material was 3 μm, but the particle diameter of the negative electrode active material is preferably 2 μm or more and less than 20 μm and more preferably 2 μm or more and 15 μm or less.

[Specific Structure of Negative Electrode]

Figure 2A:
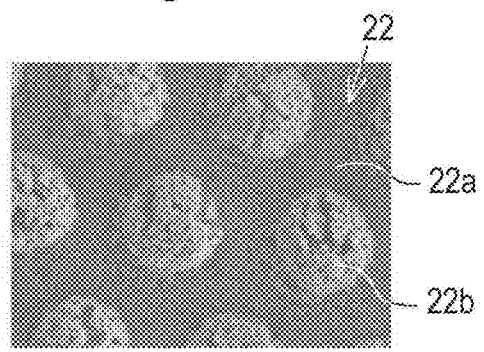
FIG. 2A is an electron microscope image illustrating a negative electrode of Experimental Example 12 before initial charging and FIG. 2B is an electron microscope image after the initial charging.
Figure 2B:
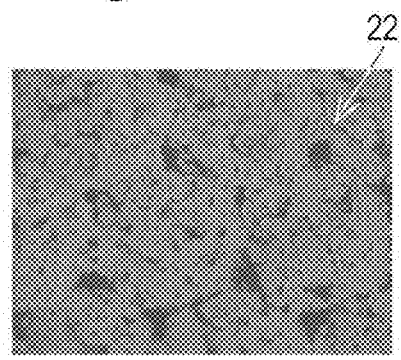
Figure 3A:
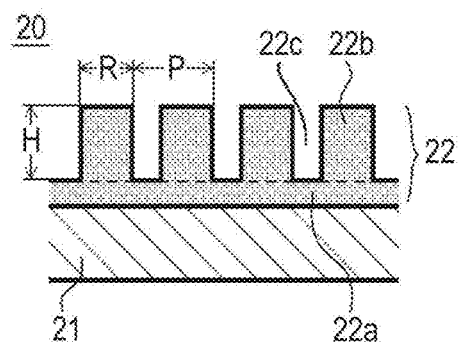
FIG. 3A is a schematic longitudinal-sectional view corresponding to FIG. 2A
Figure 3B:
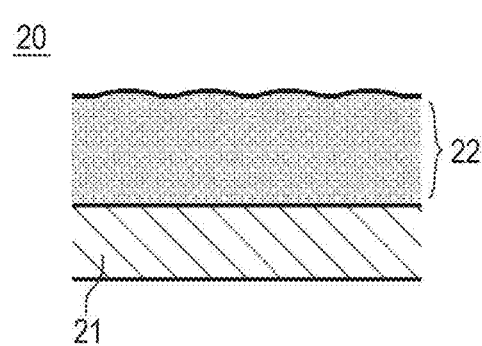
FIG. 3B is a schematic longitudinal-sectional view corresponding to FIG. 2B.
Figure 4A:
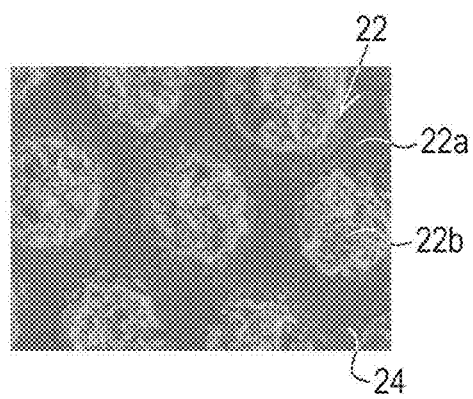
FIG. 4A is an electron microscope image illustrating a portion corresponding to FIG. 2A after initial discharging and FIG. 4B is an electron microscope image illustrating a portion corresponding to FIG. 2A after third-cycle discharging.
Figure 4B:
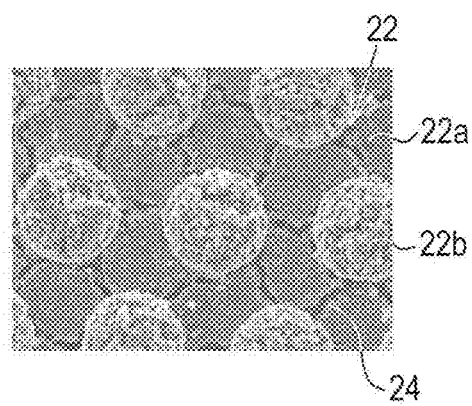

FIG. 2A is an electron microscope image (SEM micrograph) illustrating a negative electrode 20 of Experimental Example 12 before the initial charging. FIG. 2B is a SEM micrograph after the initial charging. FIG. 3A is a schematic longitudinal-sectional view corresponding to FIG. 2A. FIG. 3B is a schematic longitudinal-sectional view corresponding to FIG. 2B. FIG. 4A is a SEM micrograph illustrating the negative electrode of Experimental Example 1 after the initial discharging. FIG. 4B is a SEM micrograph after the third-cycle discharging.

As illustrated in FIG. 2A and FIG. 3A, the negative electrode 20 of Experimental Example 12 includes a negative electrode mixture layer 22 obtained by forming a base portion 22a having a particular thickness and made of a negative electrode mixture on a surface of a negative electrode current collector 21 and forming pillar portions 22b having substantially the same height and made of a negative electrode mixture on a surface of the base portion 22a. The pillar portions 22b are arranged in a staggered manner. In the cross-section, the maximum diameter R is 50 μm, the pitch P of the pillar portions 22b is 70 μm (the distance between the pillar portions 22b is 20 μm), and the height H of the pillar portions is 36 μm. The maximum diameter R, the pitch P, and the height H of the pillar portions in the cross-section are controlled in accordance with the diameter, pitch, and depth of pores formed on a die.

When initial charging is performed in this state, as illustrated in FIG. 2B and FIG. 3B, negative electrode active material particles made of silicon in the negative electrode mixture layer 22 expand and the expansion of the negative electrode active material particles is absorbed by cavities formed between the pillar portions 22b of the negative electrode mixture layer 22. Consequently, the height of the negative electrode mixture layer 22, that is, the thickness of the negative electrode mixture layer 22 does not considerably increase.

When initial discharging is performed in this state, a state illustrated in FIG. 4A is provided, which is substantially the same state as that before the initial charging. Herein, when FIG. 4A is carefully observed, it is confirmed that honeycomb-shaped fine cracks 24 are formed on the base portion 22a in a radial manner from pillar portions 22b toward other pillar portions 22b. The cracks 24 are formed by stress based on the expansion of the negative electrode active material particles in the negative electrode mixture layer 22 during charging.

As illustrated in FIG. 4B, it is confirmed from a SEM micrograph of the negative electrode 20 of Experimental Example 1 after the completion of third-cycle discharging that the width of the cracks 24 formed on the base portion 22a increases. The cracks 24 reduce the stress applied between the base portion 22a and the negative electrode current collector 21 and the stress applied to the current collector due to the expansion of the pillar portions 22b, which is believed to make it difficult to detach the negative electrode mixture layer 22 from the negative electrode current collector 21. The cracks 24 are not necessarily formed as a result of charging and discharging. By suitably changing the configuration of the die, the cracks 24 may be formed when the pillar portions 22b are formed.

By suitably adjusting the configuration of the negative electrode mixture layer 22 within the following ranges, the cracks 24 are formed as a result of charging and discharging. For example, the pitch (P in FIG. 3A) of the pillar portions 22b is 35 to 130 µm. The density of the pillar portions 22b is 0.7 to 1.7 g/cm$^3$. The maximum diameter (R in FIG. 3A) of the pillar portions 22b is 30 to 150 µm. The thickness of the base portion 22a is 1 to 20 µm. The density of the base portion 22a is 0.7 to 1.7 g/cm$^3$.

The cracks 24 may be formed at the root of the pillar portions 22b while being formed in a radial manner from pillar portions 22b toward other pillar portions 22b.

By forming the pillar portions 22b in a staggered manner, the cavities 22c formed between the pillar portions 22b are effectively arranged compared with the case where the pillar portions 22b are not formed in a staggered manner. When the negative electrode active material particles expand, the inhibition against the expansion is reduced and the particles easily diffuse toward the cavities 22c. The expansion of the negative electrode active material particles is effectively absorbed by the cavities 22c. Thus, a plurality of the cracks 24 between the pillar portions 22b are formed in a radial manner. Consequently, the stress between the negative electrode active material particles and the stress between the negative electrode active material particles and the negative electrode current collector 21 are reduced, which is believed to result in good cycle characteristics.

In the negative electrode 20, when the negative electrode active material particles expand during charging, the particles not only expand toward the cavities 22c between the pillar portions 22b, but also expand toward the inside of the pillar portions 22b. In this embodiment, the negative electrode active material layer 20 contains a binder together with a negative electrode active material. Therefore, the binder flexibly expands or shrinks, thereby uniformly forming the cracks 24 on the base portion 22a as illustrated in FIG. 3A and FIG. 3B. Consequently, the stress applied to the current collector is reduced. Herein, FIG. 2 to FIG. 4 illustrate the negative electrode 20 of Experimental Example 12, but the same tendency is shown for the negative electrodes of Experimental Examples 3 to 11 and 13.

In the above-described embodiment, the case where the pillar portions 22b have a round pillar shape has been described, but the shape of the pillar portions 22b may be a polygonal prism such as a quadrangular prism, a pentagonal prism, or a hexagonal prism and the corners may be chamfered. When the shape of the pillar portions 22b is a polygonal prism, the maximum diameter R can be calculated as a diameter of a circumcircle of the cross-section.

In Experimental Examples 1 to 13, the case where the polyimide resin formed from a polyamic acid resin is used as a binder has been described, but the same effects are produced even when a well-known polyimide resin is used from the beginning without using a polyamic acid resin serving as a precursor. A binder composed of another compound commonly used in negative electrodes for nonaqueous electrolyte secondary batteries may also be used. When the polyimide resin is used as a binder, the negative electrode active material particles are bonded to each other with the polyimide resin having a high elastic modulus. Therefore, the negative electrode active material particles can flexibly expand toward the inside of the pillar portions and the cavities between the pillar portions during charging compared with the case where the polyimide resin is not used. Consequently, the use of the polyimide resin further suppresses the damage to the electrode structure (e.g., isolation of negative electrode active material particles).

In the above-described embodiment, the case where the silicon particles are used as the negative electrode active material has been described, but a material that forms an alloy with lithium, such as germanium, tin, or zinc, may be used instead of silicon.

[Nonaqueous Electrolyte Secondary Battery]

A positive electrode, a nonaqueous electrolyte, and a separator that can be used in the nonaqueous electrolyte secondary battery according to one aspect of the present invention will be described below as an example.

(Positive Electrode)

The positive electrode suitably includes a positive electrode current collector and a positive electrode mixture layer formed on the positive electrode current collector and containing a positive electrode active material. The positive electrode mixture layer preferably contains a conductive material and a binding agent in addition to the positive electrode active material. The positive electrode active material is not particularly limited, but is preferably a lithium transition metal oxide. The lithium transition metal oxide may contain a non-transition metal element such as Mg or Al. Specific examples of the lithium transition metal oxide include lithium-cobalt composite oxides, olivine lithium phosphate such as lithium iron phosphate, and lithium transition metal oxides such as Ni—Co—Mn, Ni—Mn—Al, and Ni—Co—Al. These positive electrode active materials may be used alone or in combination of two or more as a mixture.

(Nonaqueous Electrolyte)

The nonaqueous electrolyte contains a nonaqueous solvent and an electrolyte salt dissolved in the nonaqueous solvent. The nonaqueous electrolyte is not limited to a liquid electrolyte (nonaqueous electrolytic solution), and may be a solid electrolyte that uses a gel polymer or the like. The nonaqueous solvent may be, for example, an ester, an ether, a nitrile (e.g., acetonitrile), or an amide (e.g., dimethylformamide) or a mixed solvent containing two or more of the foregoing. At least a cyclic carbonate is preferably used as the nonaqueous solvent, and both a cyclic carbonate and a chain carbonate are more preferably used. The nonaqueous solvent may also be a halogen substitution product obtained by substituting hydrogen atoms of a solvent with halogen atoms such as fluorine atoms.

The electrolyte salt is preferably a lithium salt. Examples of the lithium salt include $LiPF_6$, $LiBF_4$, $LiAsF_6$, $LiN(SO_2CF_3)_2$, $LiN(SO_2CF_5)_2$, and $LiPF_{6-x}(C_nF_{2n+1})_x$ ($1<x<6$, n: 1 or 2). These lithium salts may be used alone or in combination of two or more as a mixture. The concentration of the lithium salt is preferably 0.8 to 1.8 mol per 1 L of the nonaqueous solvent.

(Separator)

A porous sheet having ion permeability and an insulating property is used as the separator. Specific examples of the porous sheet include microporous membranes, woven fabrics, and nonwoven fabrics. The separator is suitably made of a polyolefin such as polyethylene or polypropylene.

INDUSTRIAL APPLICABILITY

The negative electrode for nonaqueous electrolyte secondary batteries according to one aspect of the present invention and the nonaqueous electrolyte secondary battery that uses the negative electrode can be applied to drive power supplies for mobile information terminals, such as cellular phones, notebook computers, and PDAs, that are particularly required to have high energy density. They are also promising for high-output uses such as electric vehicles (EVs), hybrid electric vehicles (HEVs or PHEVs), and power tools.

REFERENCE SIGNS LIST 10 monopolar cell
11 negative electrode
12 counter electrode (positive electrode)
13 separator
14 measurement cell
15 reference electrode
16 reference electrode cell
17 capillary
18 nonaqueous electrolytic solution
20 negative electrode
21 negative electrode current collector
22 negative electrode mixture layer
22a base portion
22b pillar portion
22c cavity
24 crack

The invention claimed is:

1. A negative electrode for a nonaqueous electrolyte secondary battery, comprising:
a current collector; and
a negative electrode mixture layer formed on the current collector, the negative electrode mixture layer comprising a base portion on the current collector and pillar portions protruding from the base portion,
wherein the negative electrode mixture layer comprises a binder and a negative electrode active material particle which forms an alloy with lithium,
wherein the binder comprises a polyimide resin having an average molecular weight of 60,000 or more and 200,000 or less, and
wherein cracks are formed in the base portion of the negative electrode mixture layer.

2. The negative electrode for a nonaqueous electrolyte secondary battery according to claim 1, wherein the binder is 5 to 15 mass % of the negative electrode mixture layer.

3. A negative electrode for a nonaqueous electrolyte secondary battery, comprising:
a current collector; and
a negative electrode mixture layer formed on the current collector, the negative electrode mixture layer comprising a base portion on the current collector and pillar portions protruding from the base portion,
wherein the negative electrode mixture layer comprises a binder and a negative electrode active material particle which forms an alloy with lithium,
wherein the binder comprises a polyimide resin having an average molecular weight of 30,000 or more and 200,000 or less,
wherein the binder is 7 to 18 mass % of the negative electrode mixture layer, and
wherein cracks are formed in the base portion of the negative electrode mixture layer.

4. The negative electrode for a nonaqueous electrolyte secondary battery according to claim 1, wherein the negative electrode active material particle is a Si-containing particle.

5. A nonaqueous electrolyte secondary battery, comprising:
the negative electrode for a nonaqueous electrolyte secondary battery according to claim 1,
a positive electrode containing a positive electrode active material,
a separator, and
a nonaqueous electrolyte.

6. The negative electrode for a nonaqueous electrolyte secondary battery according to claim 3, wherein the negative electrode active material particle is a Si-containing particle.

7. A nonaqueous electrolyte secondary battery, comprising:
the negative electrode for a nonaqueous electrolyte secondary battery according to claim 3,
a positive electrode containing a positive electrode active material,
a separator, and
a nonaqueous electrolyte.

8. The negative electrode for a nonaqueous electrolyte secondary battery according to claim 1, wherein the binder is 7 to 10 mass % of the negative electrode mixture layer.

9. The negative electrode for a nonaqueous electrolyte secondary battery according to claim 3, wherein the binder is 7 to 10 mass % of the negative electrode mixture layer.

* * * * *